United States Patent [19]

Nemoto et al.

[11] Patent Number: 6,142,636
[45] Date of Patent: Nov. 7, 2000

[54] BINOCULAR LENS TUBE PROTECTOR

[75] Inventors: Yasuyuki Nemoto, Fort Lee, N.J.; Kiyotaka Ishikawa, Omiya, Japan

[73] Assignee: Fuji Photo Optical Co., Ltd., Omiya, Japan

[21] Appl. No.: 09/234,713

[22] Filed: Jan. 21, 1999

[30] Foreign Application Priority Data

Jan. 22, 1998 [JP] Japan ................................. 10-024069
Mar. 30, 1998 [JP] Japan ................................. 10-099849

[51] Int. Cl.$^7$ ............................. G02B 23/16; G02B 23/00
[52] U.S. Cl. ........................ 359/600; 359/407; 359/413; 359/480
[58] Field of Search .................................... 359/399–420, 359/507–509, 511, 600, 480–482, 611

[56] References Cited

U.S. PATENT DOCUMENTS

| | | | |
|---|---|---|---|
| 3,033,079 | 5/1962 | Haupt et al. | 359/600 |
| 3,368,860 | 2/1968 | Faust et al. | 359/413 |
| 4,984,879 | 1/1991 | Plunkett | 359/480 |

FOREIGN PATENT DOCUMENTS

| | | | |
|---|---|---|---|
| 116270 | 12/1942 | Australia | 359/600 |
| WO 95/04298 | 2/1995 | European Pat. Off. | 359/407 |

*Primary Examiner*—Thong Q. Nguyen
*Attorney, Agent, or Firm*—Oblon, Spivak, McClelland, Maier & Neustadt, P.C.

[57] ABSTRACT

A telescopic lens tube protector to be fitted on telescopically connected lens tubes of a monocular or binocular telescope for protecting same from shocks of collisional impacts or the like. The lens tube protector is arranged to enshroud the entire outer peripheries of the telescopic lens tubes and constituted by a cover case which partially contains a cushioning bag structure or structures or which as a whole is in the form of a cushioning bag structure containing a cushioning material in a sealed state.

14 Claims, 8 Drawing Sheets

BINOCULAR LENS TUBE PROTECTOR

BACKGROUND OF THE INVENTION

1. Field of the Art

This invention relates to a telescope lens tube protector to be fitted on lens tubes of a monocular or binocular telescope for the purpose of protecting the lens tubes from shocks of collisional impacts or the like.

2. Prior Art

As for an example of telescopes in general, a binocular telescope or field glass is usually put in a shock-free case of an exclusive design when not used. As well known, ordinarily a strap is attached to each field glass for the convenience of the use who moves around with a field glass in an outdoor activity, permitting the user to hang down the field glass from his or her neck or shoulder while moving, looking for a bird watching spot or for other observation spot. Accordingly, when moving from one spot to another, the viewer is not necessarily required to carry the field glass in his or her hand. Nevertheless, taking into consideration that in many cases telescopes like field glasses are carried by viewers for a long time in outdoor activities, no matter whether they are hung from a neck or carried in a hand, there has been a trend for reducing the weight of telescopes to lessen the burdens in portage, either by forming lens tubes from a light-weight synthetic resin material or by reducing the wall thickness of lens tubes as much as possible in case lens tubes are made of a metal or metallic material.

In case the wall thickness of field glass lens tubes is reduced for a weight reduction, it will invariably give rise to a problem of physical weakness to shocks of collisional impacts because they are mainly intended for use in outdoor activities in which there are many possibilities of the field glasses being hit against something or inadvertently dropped on the ground as they are repeatedly put on and off the eyes of viewers in the course of a trip through a field. Namely, when subjected to collisional impacts or the like, relatively thin-walled lens tubes are susceptible to damages including deformations and fractures. In case lens tubes are damaged, deformed or fractured to a serious degree, the field glasses will not function properly even if lenses remain safely in an undamaged state. Besides, one would face a serious damage in case impacts directly act on end portions of lens tubes which can be easily deformed or fractured even by impacts of a smaller magnitude.

In this connection, it has been known in the art to cover or coat telescopic lens tubes with rubber or similar resilient material to provide protection against collisional impacts without increasing the size or weight of telescopes as a whole. However, in many cases simple rubber covering or coating of this sort is found to be unable to absorb shocks or impacts effectively, particularly, unable to prevent a deformation or damage to an end portion of a lens tube when it is hit against a hard object.

SUMMARY OF THE INVENTION

With the foregoing situations in view, it is an object of the present invention to provide a telescopic lens tube protection means which can effectively protect lens tubes of a telescope against collisional impacts or the like, without entailing a conspicuous increase in weight.

It is another object of the present invention to provide a protector which can keep end portions of telescopic lens tubes from direct influences of collisional impacts or the like.

In accordance with the present invention, the above-stated objectives are achieved by the provision of a telescopic lens tube protector to be fitted telescopically connected lens tubes of a telescope to protect same from shocks of collisional impact or the like, including an objective lens tube internally fitted with an objective lens, and an eye lens tube internally fitted with an eye lens and movable in the direction of optical axis relative to the objective lens tube. The telescopic lens tube protector according to the present invention comprises: a main cover case enshrouding substantially entire outer peripheries of the lens tubes and having a cushioning bag portion at least in one part thereof; and a lens tube end protector provided contiguously at an axial end of the main cover case and covering an end portion of at least one of the objective lens tube and the eye lens tube of the telescope.

The telescopic lens tube protector according to the present invention is applicable to both monocular and binocular telescopes.

The lens tube protector is basically constituted by a main cover case with a cushioning bag portion or portions in part thereof or by a cover case which is arranged to form a cushioning bag structure as a whole. In case the cover case contains a cushioning bag portion or portions in part thereof, the lens tube end protector may be constituted by a protective wall which is projected contiguously from the cover case in such a way as to circumvent an end portion of at least one lens tube in predetermined spaced relation with the latter up to a point beyond an extreme end of the lens tube. On the other hand, in case the cover case as a whole is formed into a cushioning bag structure, the lens tube end protector may be constituted by an end cover wall which is contiguously provided at one end of the cover case in such a manner as to wrap in end portions of the lens tube. The cushioning bag portion or bag structure of the cover case may contain in a sealed state a cushioning gas like air or a cushioning liquid, shock absorbing gel or a cushioning material like sponge.

The above and other objects, features and advantages of the present invention will become apparent from the following particular description of the invention based on preferred embodiments shown in the accompanying drawings. Needless to say, the present invention should not be construed as being limited to particular forms shown in the drawings.

Figure 6:
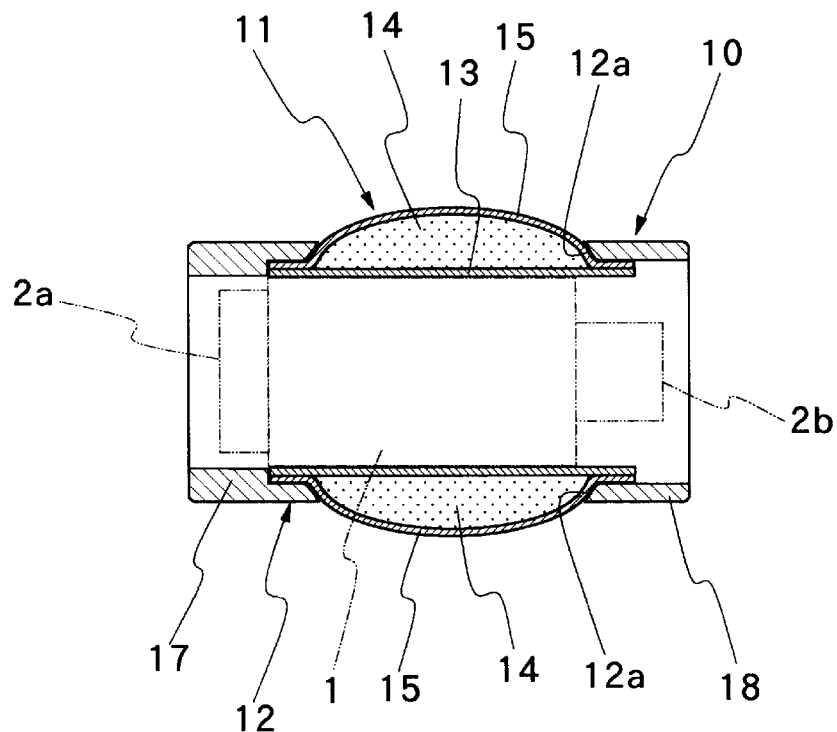
FIG. 6 is a longitudinal sectional view of the lens tube protector.
Figure 9:
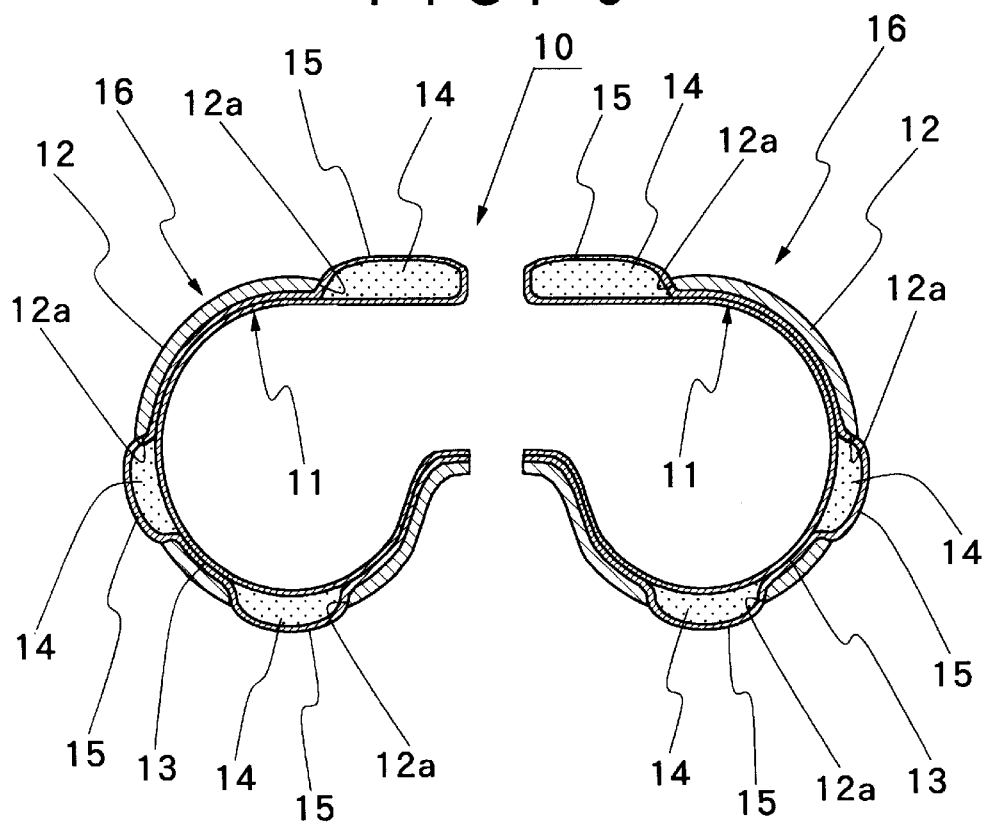
Figure 10:
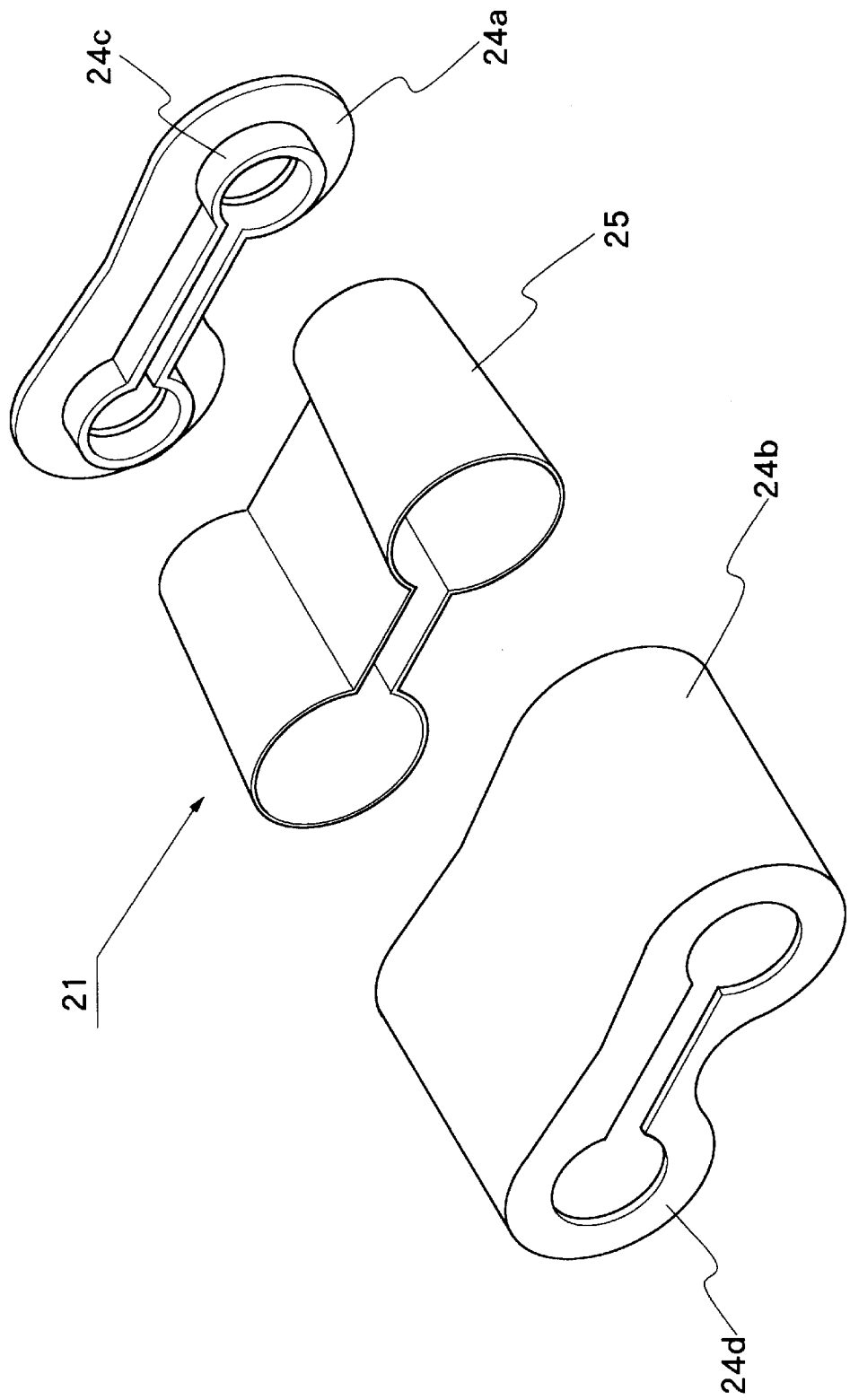
Figure 11:
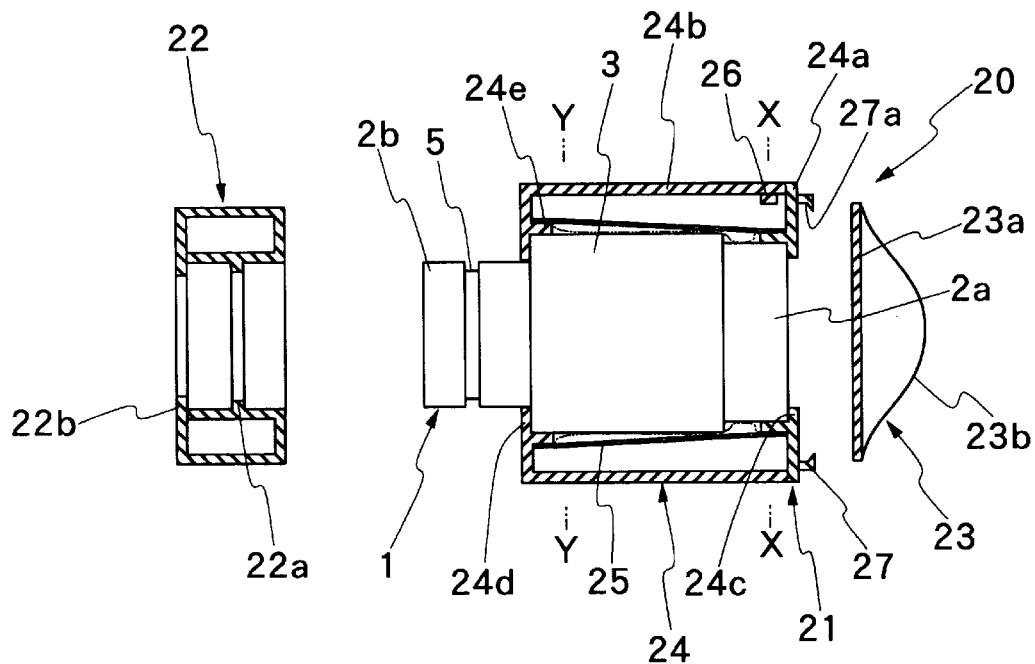
Figure 12:
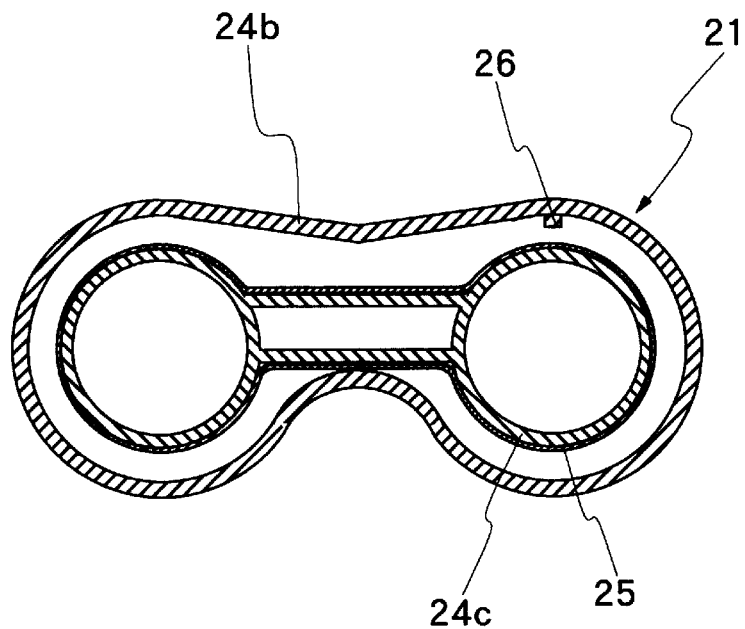
Figure 13:
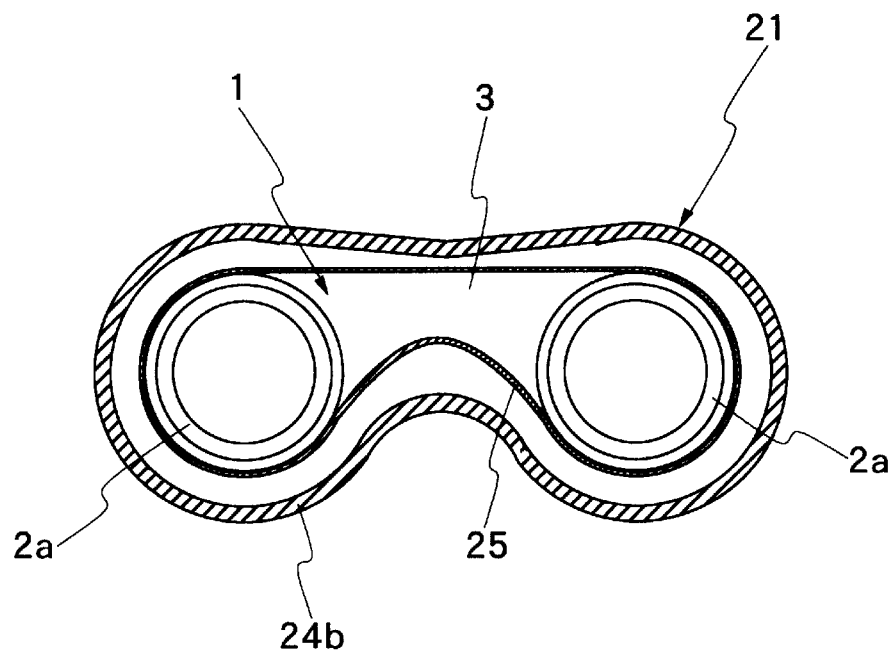

FIG .8 is a longitudinal sectional view of still another modification of the lens tube protector;

FIG. 9 is a transverse sectional view of the lens tube protector of FIG. 6;

FIG. 10 is an exploded view of an objective lens tube protector bag of a lens tube protector which has been adopted as a second embodiment of the present invention;

FIG. 11 is a sectional view of a field glasses fitted with the objective lens tube protector bag of FIG. 6, along with an eye lens tube protector bag and a lens surface protector caps of the protector which are put off;

FIG. 12 is a sectional view taken on line X—X of FIG. 11;

FIG. 13 is a sectional view taken on line Y—Y of FIG. 11; and

Figure 14:
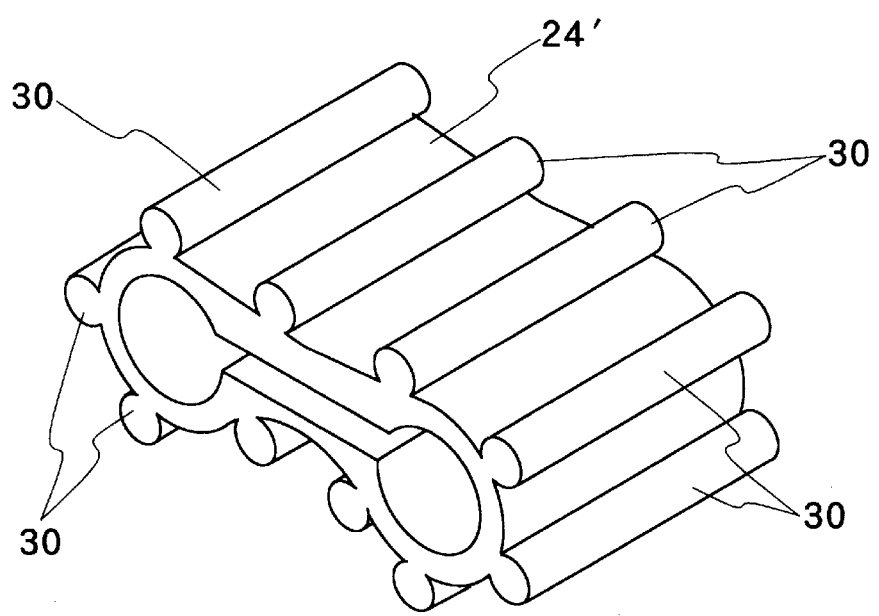

FIG. 14 is a perspective view of a modification of the objective lens tube protector bag shown in FIG. 10.

DESCRIPTION OF PREFERRED EMBODIMENTS

Hereafter, the present invention is described more particularly by way of its preferred embodiments shown in the drawings. Referring first to FIGS. 1 through 4, there is shown the general construction of a field glass as a typical example of binocular to which the present invention is applicable. In these figures, indicated at 1 is a field glass having a couple of telescopically connected lens tubes 2, which are connected with each other through an intermediate connecting member 3. Each pair of telescopic lens tubes 2 is comprised of an objective lens tube 2a which is internally fitted with an objective lens, and an eye lens tube 2b which is telescopically connected with the objective lens tube 2a and internally fitted with an eye lens or eyepiece to be looked into by a viewer.

The connecting member 3 is bridged between the two objective lens tubes 2a. In the particular embodiment shown, the connecting member 3 is arranged to hold intermediate circumferential portions of the objective lens tubes 2a. However, if desired, it may be fixedly attached to opposing lateral sides of the objective lens tubes 2a. Relative to the objective lens tube 2a, the eye lens tube 2b is telescopically movable over a predetermined range in the direction of the optical axis to permit adjustments in sight visibility according to the viewer's eye sight. For this purpose, a sight adjustment knot 4 is provided on the rear side of the connecting member 3.

Figure 1:
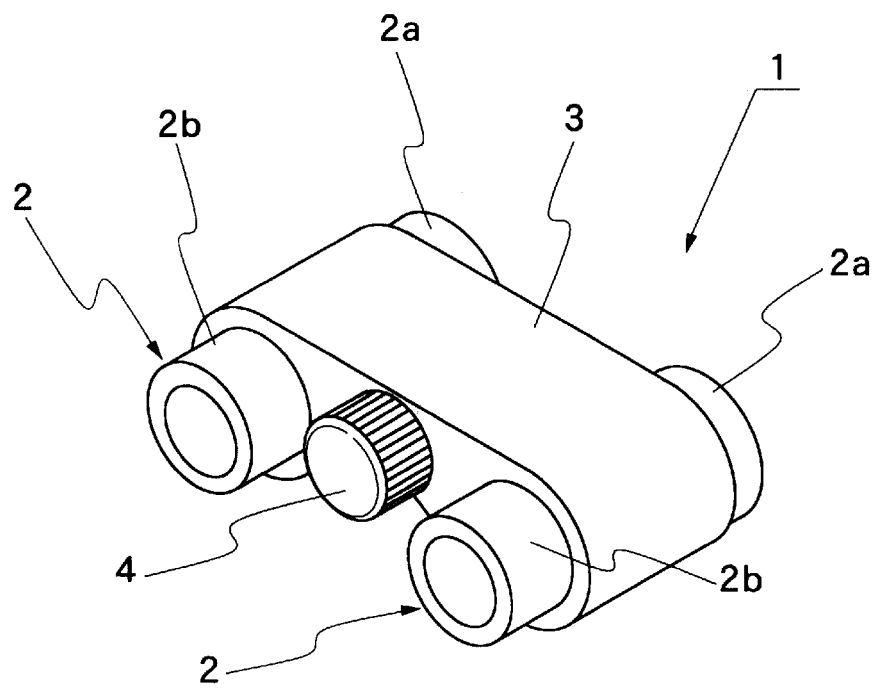
FIG. 1 is a perspective view of a field glass, shown as an example of binocular.
Figure 2:
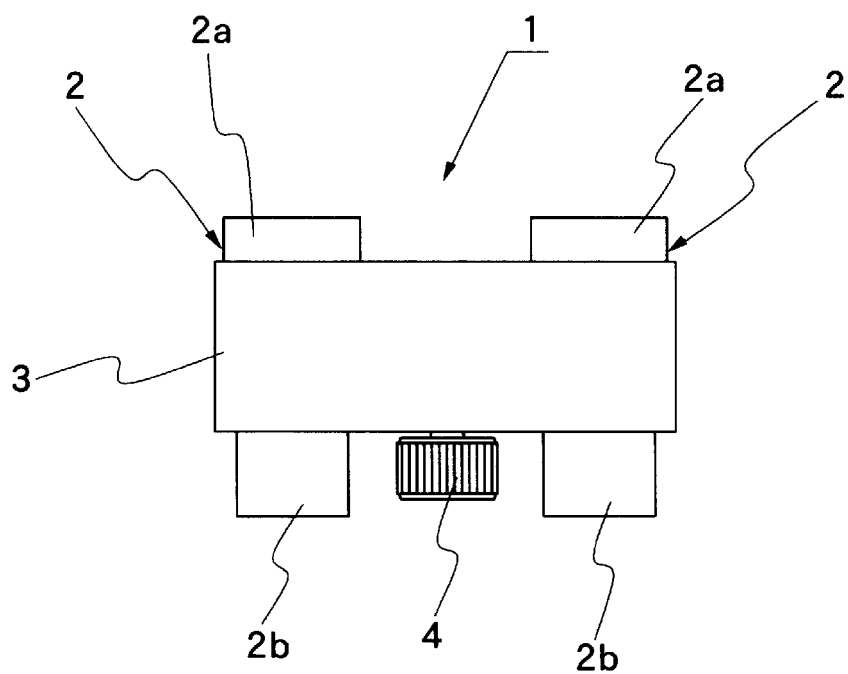
FIG. 2 is a plan view of the field glass shown FIG. 1.
Figure 3:
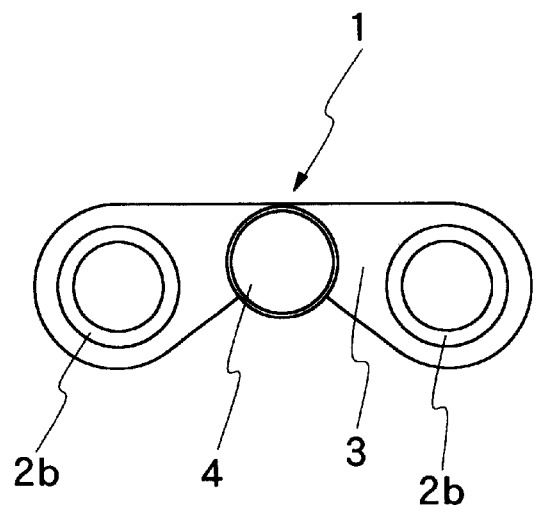
FIG. 3 is a front view of the field glass shown in FIG. 2.
Figure 4:
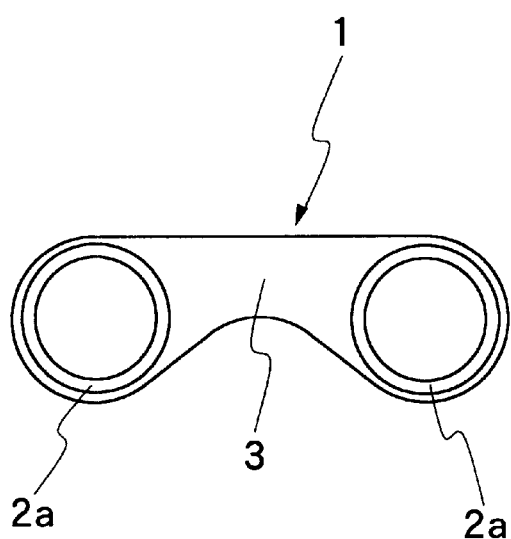
FIG. 4 is a back view of the field glass shown in FIG. 2.
Figure 5:
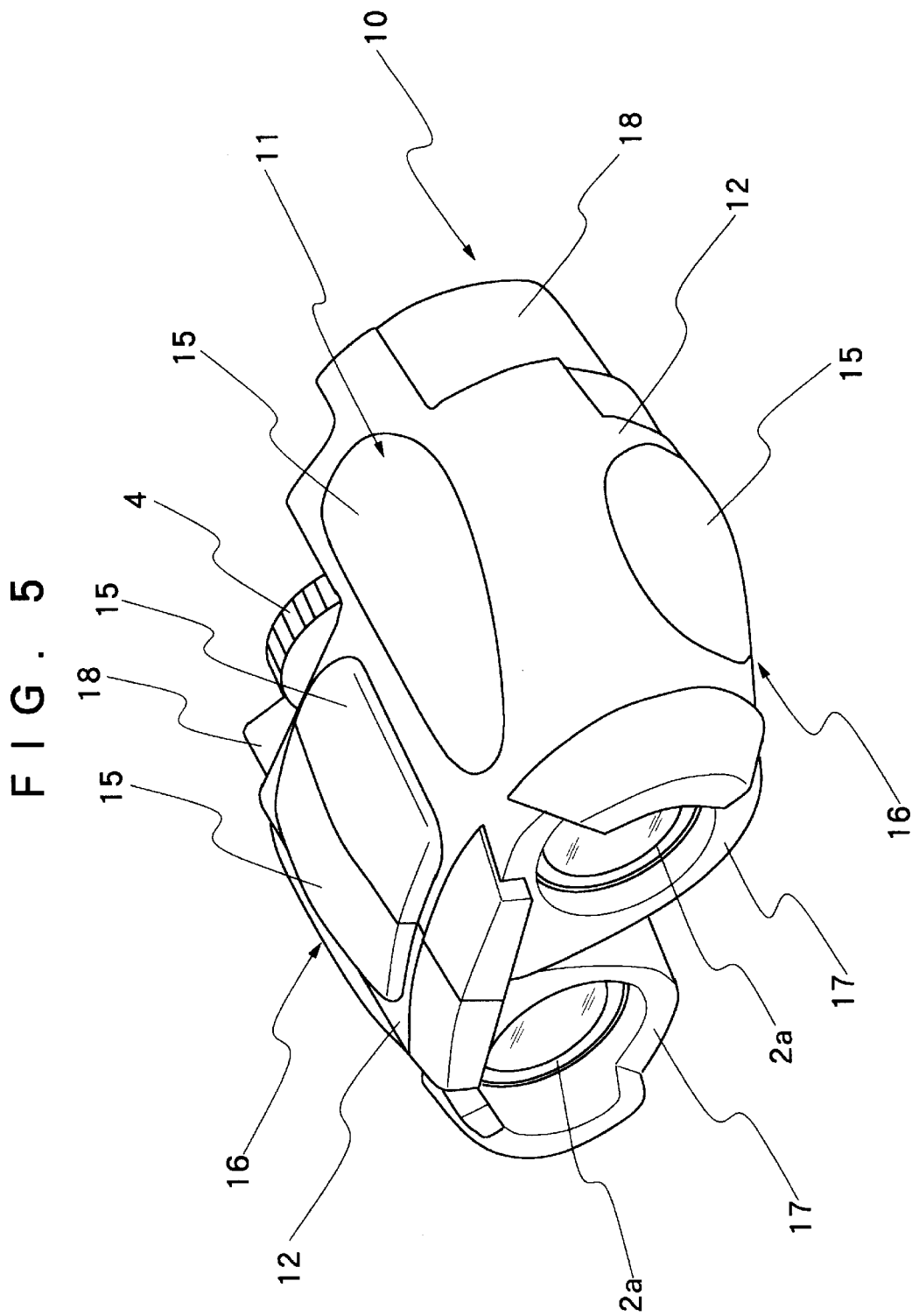
FIG. 5 is an outer view of field glass fitted with a lens tube protector which has been adopted as a first embodiment of the present invention.
Figure 7:
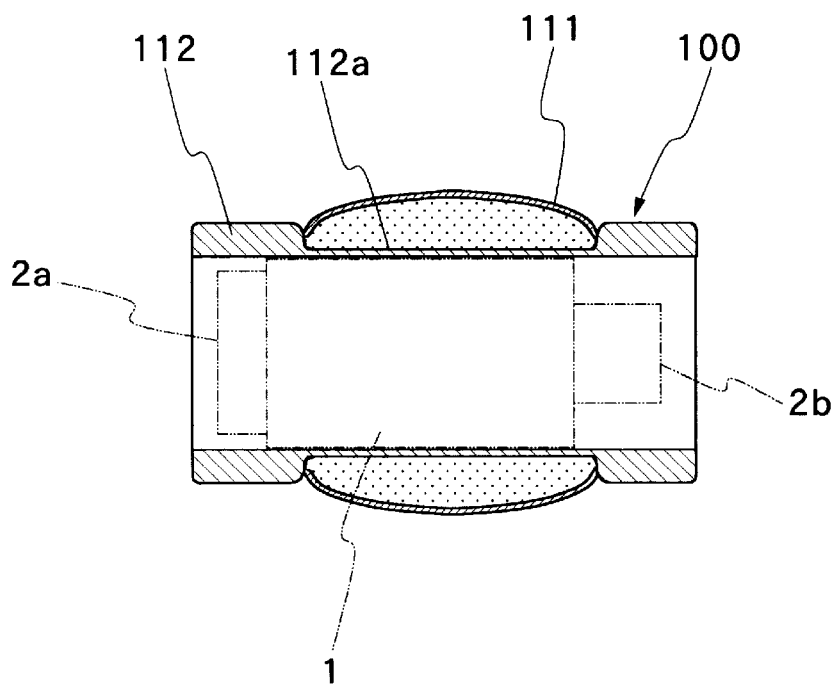
FIG. 7 is a longitudinal sectional view of a modification of the lens tube protector of the first embodiment.

As shown in FIG. 5, a lens tube protector 10 is fitted on the field glasses of the construction as described above. The lens tube protector 10 is constituted by a cover case 12 which contains a number of cushioning bag structures 11 as shown in FIG. 6. In this particular embodiment, the cushioning bag structures 11 are formed by a flexible sheet or membrane 13 in the form of a relatively thin sheet of elastic material like rubber or of a flexible sheet of a synthetic resin material, covering substantially the entire peripheral surfaces of the field glass 1. As seen in FIG. 7, the flexible membrane 13 is composed of upper and lower sheet members which are partially bonded to each other, for example, by application of heat and pressure. Namely, the inner and outer sheet members of the flexible membrane 13 are not bonded to each other at a number of predetermined areas to form a plural number of independent and outwardly bulging cushioning bag portions 15 which contain a cushioning material 14 in a sealed state, for example, a gel with high shock absorbing property like silicon gel or a cushioning material like sponge or a gaseous or liquid cushioning medium like air or water. In the particular embodiment shown, the flexible membrane 13 is arranged to provide two or three cushioning bag portions 15 on the upper side, one cushioning bag portion at each lateral side and two cushioning bag portions 15 on the lower side of the field glass 1. Each cushioning bag portion 15 is formed in a shape which is somewhat elongated in a direction parallel with the optical axis of the objective lens tubes 2a.

The cover case 12 is formed of a resilient material like rubber or formed of hard plastics or the like. Particularly, from the standpoint of shock absorbing properties which can protect the telescopic lens tubes from shocks of collisional impacts or prevent collisional impacts from being transmitted to the lens tubes, a resilient rubber material with relatively high rigidity can be suitably used for the cover case 12. The flexible membrane 13 with the cushioning bag structures 11 is located on the inner side of the cover case 12, and its bulky cushioning bag portions 15 are protruded to the outer peripheral side of the cover case 12 through opening 12a which are perforated in the latter. In this instance, protrusion of the cushioning bag portions 15 is suppressed to a minimum necessary amount in terms of shock absorbing capacity because the lens tube protector 10 which covers the outer periphery of the binocular 1 should snugly fit in the hand or hands of a viewer.

Figure 8:
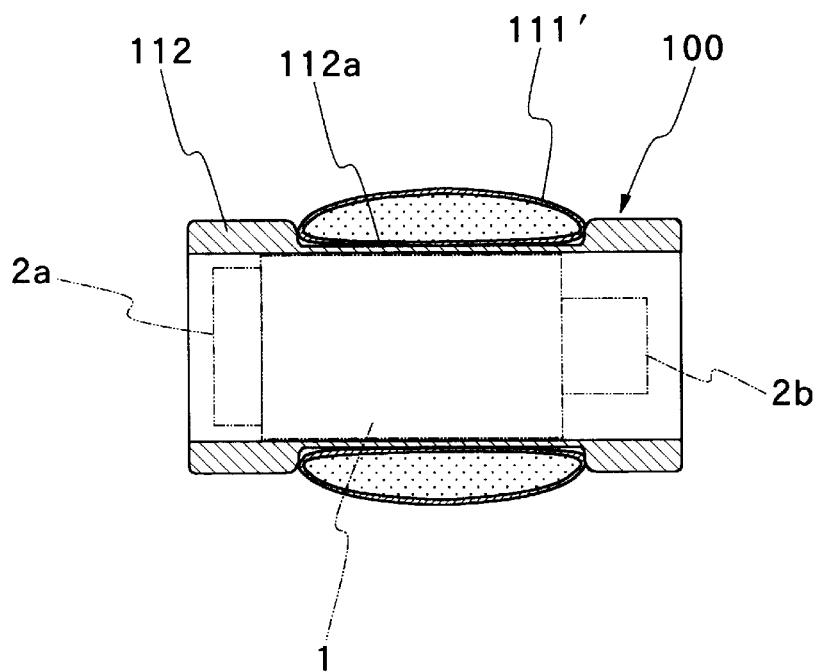

In the foregoing embodiment, the cushioning bag portions 15 are protruded on the outside of the cover case 12 through the apertures 12a. However, instead of perforating the above-described apertures, cushioning bag portions may be formed on the outer side of a lens tube protector body 100 as shown in FIG. 7, by means of recesses 112a which are formed in predetermined positions on a cover case 112, and cover sheets or membranes 111 which are bonded or welded to peripheral portions of the recesses 112a to hold therein compressed or non-compressed cushioning air or a cushioning material like silicon gel in a shielded state. Alternatively, instead of forming cushioning bag construction by the use of cover sheets or membranes 111 as just described, cushioning bags 111' which are filled with cushioning air or other cushioning material may be bonded in the recesses 112a of the cover case 112 as shown in FIG. 8.

Any way, the lens tube protector 10 is provided with cushioning bag portions in or on the cover case. For the purpose of facilitating the assembling job, it is desirable for the protector body 10 to be composed of a pair of split sections 16 which are joined with each other substantially along a center line on the upper and lower sides of the connecting member 3 as shown particularly in FIG. 9. In this case, the cover case 12 including the cushioning bags 15 is also composed of a pair of split case sections which are so shaped as to enshroud the right and left lens tubes 2 of the field glass, respectively. The split sections 16 of the protector body 10 are respectively fitted on and around the lens tubes 2 of the field glass and fixedly joined with each other by the use of an adhesive or other suitable means at their meeting end portions which are located on the connecting member 3.

In this instance, the cushioning bag portions 15 of the lens tube protector 10 are extended short of the extreme ends of the objective lens tubes 2a, but the opposite ends of the cover case 12 are extended forward and rearward beyond the extreme ends of the objective lens tube 2a. These forward and rearward extensions of the cover case 12 form circumventive front and rear end protection walls 17 and 18 around the front and rear ends of lens tubes 2. The front protection walls 17 are projected forward of the front ends of the objective lens tubes 2a to function as a front end protector, while the rear end protection walls 18 are projected rearward of the rear ends of the eye lens tubes 2b to function as a rear end protector.

The front end protection walls 17 which are projected on the front side of the objective lens tubes 2a should have a thickness which can provide sufficient protective strength against deformations or damages for the lens tubes which might otherwise be subjected to large shocks. Nevertheless, the extension length of the front end protection walls 17 should be limited to a range which would not obstruct the view field of the binocular. The front end protection walls 17 are in the shape of a couple of loops which circumvent the entire outer peripheries of front end portions of the two objective lens tubes 2a. In addition, the front end protection walls 17 are held out of contact with or at a space from outer peripheral surfaces of the objective lens tubes 2a, forming therebetween a small gap space which protects the objective lens tubes 2a from shocks of impacts or external forces which might be imposed on the front end protection walls 17.

The outside diameter of the eye lens tubes 2b is smaller than that of the objective lens tubes 2a. The rear end protection walls 18, which are formed around and projected rearward of the eye lens tubes 2b, also function as eye holder cups to be abutted around viewer's eyes. The rear end protection walls 18 are projected to a greater degree in opposite lateral side portions than in intermediate portions, with the respective end faces so shaped as to roughly fit the contour of viewer's face to shut off external light from the side of the eye lenses as much as possible. Extreme ends of the rear end protection walls 18 are projected on the rear side of the eye lens tubes 2b. Further, the rear end protection walls 18 which are extended in the rearward direction straight from the cover case 12 from a broader gap space around outer peripheral surfaces of the eye lens tubes 2a as compared with the gap space which is formed around the objective lens tubes 2a by the front end protection walls 17.

The telescopic lens tube protector of the above-described construction is fitted on the field glass 1 thereby to absorb or moderate collisional shocks or other impacts. Described below is an example of assembling the respective components of the protector with the field glass.

Namely, for instance, a cushioning material 14 (including a cushioning gas like air) is shielded in the cushioning bag structures 11 in the flexible membrane 13 to provide cushioning bag portions 15. The cushioning bag structures 11 are fixedly bonded on inner surfaces of the cover case 12 by the use of an adhesive, allowing the cushioning bag portions 15 to protrude on the outer side of the cover case 12 through the apertures 12a. A pair of split cover case sections 16, each having the cushioning bag structures 11 and a halved cover case assembled together in this manner, are fitted on the field glass 1 from the opposite lateral sides. The cover case 12 which is formed of relatively stiff resilient material like hard rubber or hard plastics can be easily fitted on the field glass by resiliently spreading the open side of each split cover case section 16. After being fitted on the right and left lens tubes 2 of the field glass, the split sections 16 of the cover case 12 are fixedly joined or united with each other by the use of an adhesive. As a consequence, the lens tube protector 10 is fitted and retained on the field glass 1.

The respective lens tubes of the field glass 1 are substantially entirely girthed by the protector 10 and thereby completely protected from shocks of collisional impacts or the like. Therefore, even in the event the field glass is inadvertently dropped on the ground or collided against a hard object, the respective bag portions 15 on the protector 10 function to absorb the impacts of collision effectively for protection of the lens tubes. Most part of the field glass 1 is covered with the cushioning bag portions 15, except the surfaces of the objective and eye lenses, so that, under normal conditions, outwardly protruding bag portions firstly come into contact with a colliding object to absorb the impacts of collision. In case a collisional impact were imposed on a cover case portion other than the cushioning bag portions, it might cause a damage to the cover case 12 but it would barely lead to deformations, fracture or other serious damages of the field glass 1 under the cover case 12.

In this regard, the objective lens tubes 2a as well as the eye lens tubes 2b are each constituted by a cylindrical member having a lens element mounted therein. Although each lens tube is formed of a metal or the like, it is usually reduced in wall thickness for weight reduction and compactness as mentioned hereinbefore. Therefore, if an impact is locally imposed on an end portion of the thin-walled lens tube 2a or 2b, it is very likely that the end portion of the lens tube be deformed or damaged seriously even if applied impact is of a relatively low magnitude. However, according to the present invention, end portions of both the lens tubes 2a and 2b are completely covered by the front and rear end protection walls 17 and 18 which are arranged to circumvent end portions of the lens tubes 2a and 2b in a small gap relation therewith. Accordingly, there is no possibility of a hard object coming directly into collision against the lens tubes 2a and 2b, particularly, against end portions of the lens tubes 2a and 2b. The front and rear end protection walls 17 and 18 are hardly deformable in case they are formed of a rigid material. On the other hand, in case the front and rear end protection walls 17 and 18 are formed of an elastic material such as rubber or the like, they should preferably have a certain degree of rigidity suitable for limiting elastic deformations of the protection walls to a range corresponding to the width of the gap space around the lens tubes 2a and 2b even under strong impacts, for keeping the lens tubes 2a and 2b safe from the influence of strong impacts.

Accordingly, when the front or rear side of the field glass is collided against a hard object, the collisional impact is invariably sustained by either the front or rear end protection wall 17 or 18. On such an occasion, either the front or rear end protection wall 17 or 18 can be damaged or deformed by strong impacts. Nevertheless, since the respective component parts of the lens tube protector including the cover case 12 are separably fitted on the field glass 1, a damaged part of the protector can be easily replaced by a fresh one whenever necessary. Namely, damages caused by collisional impacts can be repaired in an extremely facilitated manner and in an inexpensive way, simply necessitating to replace only a damaged part of the protector.

Further, taking a monocular field glass as another example of telescopes, the field glass is constituted by a single lens barrel having an objective lens tube and an eye lens tube telescopically movable relative to the objective lens in the direction of the optical axis. In the case of a monocular field glass of this sort, it suffices for the cover case to contain a number of cushioning bag structures which can enwrap only one of the objective lens tubes 2a of the above-described binocular field glass, and each one of the front and rear end protections walls may be simply of a cylindrical shape. Since there is no necessity for providing two divided or split sections for twin lens barrels, the end protection walls can be formed in a true cylindrical shape as long as they can be axially fitted on a lens tube. Preferably, a slit is provided in the end protection walls if they are of a material which undergoes elastic deformation relatively easily.

The main function of the lens tube protector is to protect telescopic lens tubes from shocks of collisional impacts. However, in addition to the functions as a shock-free protector cover, the lens tube protector can be arranged to include functions as a decorative cover or as an anti-slip cover. The main body of the lens tube protector, which is constituted by a cover case containing a number of cushioning bag portions or structures, may further include a number of additional members to be fitted on other functioning parts of a telescope.

Shown in FIGS. 10 through 13 is a second embodiment of the present invention. In this particular embodiment, the lens tube protector has a main protector cover case 20 composed of an objective lens tube protector bag 21 of the shape as shown in FIG. 10 which is arranged to cover a couple of objective lens tubes 2a along with a connecting member 3 of a binocular field glass, and a pair of eye lens tube protector bags 22 of the shape as shown in FIG. 11 which are arranged to cover the ends of two eye lens tubes 2b separately. The lens tube protector further includes lens surface protector caps 23 to be fitted on fore ends of the objective lens tubes 2a.

The objective lens tube protector bag 21 is formed of resilient rubber material as a whole, including an outer cover case 24 and a flexible inner membrane 25. The outer cover case 24 is composed of an end cover 24a for covering fore end portions of the objective lens tubes 2a, and a main outer cover case 24b which is fixedly connected with the end cover 24a and so shaped as to cover the two objective lens tubes 2a along with the connecting member 3 which is bridged between the two objective lens tubes 2a.

As seen particularly in FIG. 11, the end cover 24a serves as a front stopper wall for the objective lens tubes 2a, and is provided with a couple of openings in axial alignment with the objective lens tubes 2a, respectively. A stopper flange 24c is formed on the inner side of the end cover 24a around the above-mentioned openings to cover fore end portions of the objective lens tubes 2a. Thus, part of the stopper flange 24c functions as an end cover wall of a front end protector of each objective lens tube 2a. In this instance, the opening in the end cover 24a are of a diameter which substantially corresponds to the inside diameter of the objective lens tubes 2a, while the stopper flange around each opening has an inside diameter which is substantially same as or slightly larger than the outside diameter of the objective lens tubes 2a. Accordingly, front end faces and outer peripheral surfaces in fore end portions of the objective lens tubes 2a are covered by the stopper flange 24c.

The main outer cover case body 24b is generally of a cylindrical shape, and internally provided with cylindrical cavities side by side for receiving the two objective lens tubes 2a and, therebetween, a space or cavity for receiving the connecting member 3. The outer cover case 24b is provided with an inwardly folded stopper wall 24d at its rear end, circumventing outer peripheries of the eye lens tubes 2b which are telescopically led out of the rear ends of the respective objective lens tubes 2a. The rear stopper wall 24d is held in abutting engagement with rear ends of the objective lens tubes 2a and the rear side of the connecting member 3, and provided with an opening for passing a shaft portion of a sight adjustor knob 4. Further, projected on the inner side of the rear stopper walls 24d is a retainer wall 24e which is arranged to circumvent and hold rear end portions of the two objective lens tubes 2a and of outer surfaces of the connecting member 3 when assembled with the latter.

The flexible inner membrane 25 is in the form of a thin sheet or membrane which is thinner than the outer cover case 24. As shown in FIGS. 12 and 13, the flexible inner membrane 25 is provided with two cylindrical portions side by side for covering the objective lens tubes 2a and a flat intermediate portion for covering upper and lower sides of the connecting member 3. The fore end of the flexible inner membrane 25 is securely fixed to horizontal portions of the stopper flange 24c on the end cover 24a, while the rear end of the flexible inner membrane 25 is securely fixed to the above-mentioned retainer wall 24e. Thus, the objective lens protector bag 21 is arranged to define a closed space between the outer cover case 24 and the flexible inner membrane 25. The objective lens protector bag 21 which is constituted by three assembled parts, i.e., the end cover 24a, the outer cover case 24b and the flexible inner membrane 25. In an assembling stage, for example, firstly the stopper flange 24c and the retainer wall 24e are fixedly bonded to the end cover 24a and the outer cover case 24b, respectively, and then the opposite ends of the flexible inner membrane 25 are fixedly bonded to the stopper wall 24c and the retainer wall 24e to form the objective lens protector bag 21. Instead of employing separate parts, for example, the end cover 24a and the outer cover case 24b may be provided as one integral structure if desired.

For securer cushioning effects, a cushioning material 14 such as silicon gel, sponge or the like, a cushioning gas like air or a suitable cushioning liquid is sealed in the objective lens protector bag 21. In case air is to be filled in as a cushioning material, the outer cover case 24 is provided with an air feed section 26 in the form of a projection which is formed by inwardly projecting part of the wall of the outer cover case 24. Air is sent into the objective lens tube protector bag 21 by way of a needle end of an air pumping means penetrating the air feed section 26. As air is fed into the objective lens tube protector bag 21, the flexible inner membrane 25 is inflated inward through elastic deformation until it is pressed into intimate contact with outer peripheral surfaces of the objective lens tubes 2a.

On the other hand, the eye lens tube protector bags 22 are each constituted by a rubber bag having inner and outer walls substantially in the shape of cylindrical double loops which are closed at the opposite ends. Air is sealed in each eye lens tube protector bag 22 to maintain same in an inflated state. In order to retain the eye lens tube protector bag 22 fixedly on the eye lens tubes 2b, an annular interlocking protuberance or rib 22a is formed on the inner periphery of each eye lens tube protector bag 22 and engaged with an annular groove 5 which is provided on the part of the eye lens tube 2b. Through engagement of the annular protuberance 22a and annular groove 5, each eye lens tube protector bag 22 can be fixed on the eye lens tube 2b in a stable state. Further, each eye lens tube protector bag 22 is provided with an annular flange 22b on and around the inner periphery of its rear end, the annular flange 22b having a width corresponding to the thickness of the eye lens tube 2b and forming a rear end cover wall for protection of the rear end of the eye lens tube 2b.

Furthermore, the lens tube protector includes lens surface protector caps 23 for covering the openings at the fore ends of the objective lens tubes 2a which are fitted with an objective lens. The lens surface protector caps 23 are each constituted by a base member 23a in the form of a relatively thick circular plate of rubber or the like and a flexible membrane 23b which has it outer peripheral portions bonded to one side of the base member 23a. The flexible membrane 23b is inflated to a predetermined degree by introducing and sealing air in the lens surface protector cap 23. These lens surface protector caps 23 are put on the end cover 24a at the front end of the outer cover case 24 of the objective lens protector bag 21 to close the openings in the end cover 24a. In order to hold the lens surface protector caps 23 stably in position, an annular stopper rings 27 is provided around each opening in the end cover 24a. The stopper ring 27 is formed with a stopper groove 27a on its inner periphery for detachably holding the base member 23a of the lens surface protector cap 23. In this instance, the eye lens tube protector bag 22 as well as the lens surface protector caps 23 are inflated with cushioning air. In order to facilitate the job of pumping in cushioning air, the eye lens tube protector bag 22 and the lens surface protector caps 23 are preferably provided with an air feed section to be pierced by an air pump needle similarly to the air feed section 26 of the outer cover case 24.

The protector 20 with the components as described above is fitted on lens tubes of the field glass 1 to keep the latter from shocks of collisional impacts. In this case, the objective lens tube protector bag 21, the eye lens tube protector bag 22 and the lens surface protector caps 23 are fitted on the field glass 1 independently of each other. Described below is an example of procedures to be followed in assembling the respective components of the protector 20 on the field glass 1.

In the first place, the objective lens tube protector bag 21, with the flexible inner membrane 25 still in a deflated state, is fitted on the objective lens tubes 2a from the front side of the latter. At this time, the objective lens tube protector bag 21 can be easily put on by crushing or collapsing the rear stopper wall 24d at the rear end of the outer cover case 24 toward the outer side through elastic deformation. When the air space between the outer cover case 24 and the flexible inner membrane 25 is evacuated to a certain degree, the flexible inner membrane 25 is pulled toward the outer cover case body 24b away from circumferential surfaces of the field glass 1, permitting to fit on the objective lens tube protector smoothly until the end cover 24a of the outer cover case 24 comes into abutting engagement with fore end portions of the objective lens tubes 2a. At this time, the fore ends of the objective lens tubes 2a are pushed and fitted in annular wall portions of the stopper flange 24c around the openings in the end cover 24a.

In this state, the end cover 24 is inflated with cushioning air which is sent thereinto through an air pump needle penetrating the air feed section 26. At this time, the inflation of the objective lens tube protector bag 21 takes place from the side of the thin flexible inner membrane 25, urging same into intimate contact with the objective lens tubes 2a and the connecting member 3. As soon as the outer cover case 24 starts to expand, the air pump is extracted from the air feed section 26 to cut off the air supply, completing the fitting of the objective lens tube protector bag 21.

As a result, the objective lens tube protector bag 21 is fitted in position, substantially gripping the objective lens tubes 2a dn the connecting member 3 between the end cover 24a and the stopper wall 24d and at the same time holding the opposite ends of the objective lens tubes 2 in position by fitting engagement with the stopper flange 24c and the retainer wall 24e. In case the outer cover case 24 is formed of rubber material with a suitable degree of stiffness, the objective lens tube protector bag 21 can be retained stably in a predetermined position relative to the field glass 1, without deviations in relation positions or dislodgement from its position. However, for the purpose of augmenting its stability furthermore, an adhesive may be applied to the stopper flange 24c and/or retainer wall 24e for bondage to the objective lens tubes 2a or other parts of the field glass.

The eye lens tube protector bags 22 can be fitted on the eye lens tubes 2b until the annular flanges 22b are abutted against the rear end faces of the eye lens tubes 2b, by resiliently spreading the opening in the respective eye lens tube protector bags 22 which may be in a deflated state or inflated with a certain amount of air. Once fitted on, the eye lens tube protector bags 22 are fixedly retained in position by engagement of the interlocking protuberance or rib 22a with the annular grooves 5 on the part of the eye lens tubes 2b.

In a case where it is difficult to ensure sufficient strength of connection by the engagement of the interlocking rib 22a and the annular groove 5 or where no annular groove 5 is provided on the part of the eye lens tube 2b, each eye lens tube protector bag 22 may be bonded on the eye lens tube 2b by means of an adhesive without providing any interlocking rib 22a thereon.

Each lens surface protector cap 23, which has the flexible membrane 23b inflated to shape beforehand by introducing cushioning air thereinto under predetermined pressure, can be put on by spreading and fitting the base portion 23a in the stopper groove 27a of the stopper ring 27 which is provided on the end cover 24a of the outer cover case 24 of the objective lens tube protector bag 21.

Since the eye lens tube protector bags 22 are formed separately and independently of the objective lens tube protector bag 21, the sight adjustor knob 4 can be turned freely to adjust the field glass to the viewer's eye sight after fitting the lens tube protector 10 as described above. When the field glass 1 not used, the lens surface protector caps 23 are put on by pushing same into the stopper rings 27 to completely cover the fore ends of the objective lens tubes 2a for protection of the objective lenses inside. Of course, the lens surface protector caps 23 have to be removed when using the field glass 1. When in use, however, only minimum necessary surfaces areas of the filed glass are exposed to the outside, including the surfaces of objective lenses in the objective lens tubes 2a and of the eye lenses in the eye lens tubes 2b.

In this instance, the objective lens tube protector bag 21, the eye lens tube protector bags 22 and the lens surface protector caps 33 are all in the form of an air bag of resilient material which contains cushioning air in a sealed state, and therefore can produce extremely favorable cushioning effects in protecting the respective components of the field glass 1 from shocks of strong impacts which may be imposed on the field glass. Accordingly, the field glass is protected from shocks of even stronger impacts as would be imposed thereon repeatedly when the field glass is accidentally dropped on the ground during use on a rocky height and caused to tumble down to the foot of a rocky slope. On such an occasion, the lens tube protector 10 which is composed of air bag structures can absorb impacts extremely effectively. Although the field glass 1 as a whole is bounced repeatedly at such a time, damages to the lens tubes 2 as well as to the lenses which are mounted in the lens tubes 2 are very unlikely to occur unless they are directly hit by a hard object.

Normally, thin-walled end portions of the objective lens tubes 2a and the eye lens tubes 2b, which constitute the telescopic lens tubes 2, can be easily deformed or damaged even by impacts of low magnitude. However, according to the present embodiment, end portions of the lens tubes 2a are covered by the walls of the stopper flange 24c, which form part of the objective lens tube protector bag 21, that is, an air bag with high shock absorbing capacity which, through elastic deformation, effectively absorbs even impacts of collision against a hard object, producing sufficient cushioning effects on fore end portions of the objective lens tubes 2a for keeping same from shocks of strong collisional impacts. Same applies to rear end portions of the eye lens tubes 2b covered by the ribs 22a of the eye lens tube protector bags 22, which similarly can effectively absorb collisional impacts to keep end portions of the eye lens tubes 2b from strong impacts.

As a consequence, even when the field glass 1 is collided against a hard object, end portions of the lens tubes 2a and 2b are kept and protected from direct influences of impacts which might result from the collision. The protector bags 21 and 22 however are unable to provide protections against external forces which act on the side of inner peripheries of the lens tubes 2a and 2b although such forces acting from inside may cause a material damage to a lens or lenses. Nevertheless, for protection of end portions of the lens tubes 2a and 2b, it suffices to provide effective protections against external forces acting on the side of outer peripheries of the lens tubes 2a and 2b. In this regard, the ribs 22a and stopper flange 24c which are inwardly projected from the protector bags 21 and 22 can protect end portions of the lens tubes to a sufficient degree.

Further, both the objective lens tube protector bag 21 and the outer cover case 24 of the lens tube protector 10 are formed of a relatively thick material, so that they have a broad freedom in exterior design or texture and may be arranged to contain decorative elements or anti-slip surfaces. In case the outer cover case 24 is formed of a shape retainable material, it can be designed freely in a desired shape which is not influenced by the shapes of the lens tubes 2 and connecting member 3. Accordingly, for example, a large number of parallel ridges 30 may be formed on the exterior surface of an outer cover case 24' in the direction of optical axis as shown in FIG. 14 if desired.

What is claimed is:

1. A binocular lens tube protector to be fitted on a plurality of telescopically connected lens tube assemblies of a binocular telescope to protect said binocular telescope from any one of shocks of collisional impacts and other similar sudden contacts, wherein each lens tube assembly of said plurality of lens tube assemblies includes an objective lens tube internally fitted with an objective lens and an eye lens tube internally fitted with an eye lens, and wherein said eye lens tube is movable in an axial direction relative to said objective lens tube, said binocular lens tube protector comprising:

a cover case having a main portion, wherein said main portion of said cover case enshrouds substantially entire outer peripheries of each lens tube assembly of said plurality of lens tube assemblies and containing a sealed cushioning bag portion at least in one part thereof; and a lens tube end protector provided contiguously at an axial end of said main portion of said cover case covering an end portion of at least one of said objective lens tube and said eye lens tube of each lens tube assembly of said plurality of lens tube assemblies.

2. The binocular lens tube protector as defined in claim 1, wherein said lens tube end protector includes an end protector wall, said end protector wall extending axially from a first end of said main portion of said cover case beyond an extreme end portion of each lens tube assembly of said plurality of lens tube assemblies to cover at least a part of outer peripheral surfaces of said end portion of said at least one of said objective lens tube and said eye lens tube so as to be in small gap relationship therewith.

3. The binocular lens tube protector as defined in claim 2, wherein said main portion of said cover case and said binocular lens tube protector are formed of any one of a resilient and rigid material.

4. The binocular lens tube protector as defined in claim 2, wherein said main portion of said cover case includes a flexible membrane forming at least one cushioning bag portion in said main portion of said cover case, said at least one cushioning bag portion of said flexible membrane extending from a circumference of said main portion of said cover case through an aperture provided in said main portion of said cover case.

5. The binocular lens tube protector as defined in claim 2, wherein said main portion of said cover case includes at least a recessed surface portion in a predetermined position on a circumference of said main portion of said cover case, and a cushioning bag fixedly located on said recessed surface portion of said main cover case.

6. The binocular lens tube protector as defined in claim 2, wherein said main portion of said cover case is arranged to function as any one of a decorative cover and as an anti-slip cover of said binocular telescope.

7. The binocular lens tube protector as defined in claim 1, wherein an entirety of said main portion of said cover case includes a cushioning bag structure adapted to enshroud both said substantially entire outer peripheries of each lens tube assembly of said plurality of lens tube assemblies and an end protector wall which extends from said cushioning bag structure to cover said end portion of id at least one of said objective lens tube and said eye lens tube.

8. The binocular lens tube protector as defined in claim 7, further comprising an eye lens protector bag structure adapted to enshroud outer peripheral surfaces of said eye lens tube, and an end cover wall which extends from said eye lens tube protector bag structure to cover an end portion of said eye lens tube.

9. The binocular lens tube protector as defined in claim 7, wherein said cushioning bag structure includes an outer cover case formed of a relatively thick resilient material and an inner flexible membrane, said inner flexible membrane being capable of holding a cushioning fluid in a sealed state therein and being adapted to be held in intimate contact with an outer peripheral surface of at least said objective lens tube when inflated by introduction of said cushioning fluid.

10. The binocular lens tube protector as defined in claim 9, wherein said end protector wall contiguously extends outwardly from said outer cover case.

11. The binocular lens tube protector as defined in claim 9, wherein said outer cover case is arranged to function as any one of a decorative cover and as an anti-slip cover of said binocular telescope.

12. The binocular lens tube protector as defined in claim 9, wherein said outer cover case includes an end cover positioned on and around fore end portions of said objective lens tube, wherein said outer cover case is provided with openings axially in alignment with said objective lens tube, and wherein a main outer cover case is connected to a rear side of said end cover, said main outer cover case being adapted to enshroud said outer peripheral surfaces of said objective lens tube and a connecting member bridged between said objective lens tube and an adjacent objective lens tube.

13. The binocular lens tube protector as defined in claim 1, wherein said main portion of said cover case includes a single structure, said single structure being adapted to enshroud both outer peripheries of a pair of objective lens tubes and a connecting member bridged between said pair of objective lens tubes.

14. The binocular lens tube protector as defined in claim 1, wherein said cushioning bag portion is adapted to hold a cushioning material selected from a group consisting of a cushioning gas including air, a cushioning liquid, shock absorbing gel, and sponge.

* * * * *